United States Patent [19]

Chapman et al.

[11] Patent Number: 5,500,325
[45] Date of Patent: Mar. 19, 1996

[54] DYE MIXTURES FOR OPTICAL RECORDING LAYERS

[75] Inventors: Derek D. Chapman, Rochester; Ramanuj Goswami, Webster; Csaba A. Kovacs, Rochester, all of N.Y.

[73] Assignee: Eastman Kodak Company, Rochester, N.Y.

[21] Appl. No.: 376,622

[22] Filed: Jan. 23, 1995

Related U.S. Application Data

[63] Continuation of Ser. No. 140,646, Oct. 21, 1993, abandoned.

[51] Int. Cl.$^6$ .............................. G03C 1/72; G11B 7/24
[52] U.S. Cl. .................... 430/270.16; 430/271.1; 430/495.1; 430/945; 430/273.1; 430/275.1; 369/284; 369/288
[58] Field of Search ...................... 430/270, 271, 430/273, 275, 495, 945, 223, 226; 428/64, 65, 913, 914; 346/135.1; 369/288, 283, 284, 286

[56] References Cited

U.S. PATENT DOCUMENTS

| | | | |
|---|---|---|---|
| 4,287,292 | 9/1981 | Chapman et al. | 430/223 |
| 4,358,527 | 11/1982 | Bailey et al. | 430/223 |
| 4,412,231 | 10/1983 | Namba et al. | 430/945 |
| 4,425,422 | 1/1984 | Komamura et al. | 430/226 |
| 4,521,506 | 6/1985 | Stolzerburg et al. | 430/223 |
| 4,562,139 | 12/1985 | Reczek | 430/223 |
| 4,579,817 | 4/1986 | Bergthaller et al. | 430/223 |
| 4,686,143 | 8/1987 | Yoshikawa et al. | 346/135.1 |
| 4,735,889 | 4/1988 | Namba et al. | 430/945 |
| 5,141,785 | 8/1992 | Yoshinada et al. | 430/945 |
| 5,178,995 | 1/1993 | Fukui et al. | 430/945 |
| 5,426,015 | 6/1995 | Chapman et al. | 430/945 |

FOREIGN PATENT DOCUMENTS 462092 2/1992 Japan.

*Primary Examiner*—Charles L. Bowers, Jr.
*Assistant Examiner*—M. Angebranndt
*Attorney, Agent, or Firm*—John R. Everett

[57] ABSTRACT

A dye mixture is disclosed. The mixture is useful in recording layers of optical recording elements. The mixture has:

a) a real index of refraction of at least 1.8 in the 780 to 790 nm region of the spectra;

b) an imaginary index (k) between 0.3 and 0.02 in the 780 to 790 nm region of the spectra;

c) a metallized azo dye comprising an azo group linking a substituted 3-hydroxy-pyridine nucleus to a phenyl nucleus wherein the phenyl nucleus has an alkoxy or thioether substituent at its 2-position; and d) at least a second dye.

9 Claims, No Drawings

DYE MIXTURES FOR OPTICAL RECORDING LAYERS

This application is a continuation of U.S. Ser. No. 08/140,646, filed Oct. 21, 1993 now abandoned.

FIELD OF THE INVENTION

The present invention relates dye mixtures. The mixtures are particularly useful in optical recording layers and elements.

BACKGROUND OF THE INVENTION

Optical recording materials for storing information are known. One of the currently popular forms of optical storage of information is the compact disk or CD. Digital information is stored in the form of marks or with low specular reflectivity pits on an otherwise reflective background. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the specular reflectivity is lower than in those areas not having the deformations.

It is desirable to produce optical recording media which, when recorded in real time, produces a record that mimics CD-ROM on read out. Read out is at about 780 nm. In this manner, information can be added to the CD and the CD can be used on a conventional CD player.

One recently disclosed system of this type is the so called "Photo CD". In this system, conventional photographic film is first processed in a conventional manner. Then, the images from the film are digitized and the digital information is recorded in a CD readable form on an optical recording material. Images can then be played back by means of a CD type player on a conventional television. Since the Photo CD is not recorded to its capacity in a single session, or played back only once, long time multi session recording and play back capacity is needed. Thus, the need for very stable recording materials.

One method for forming a recordable element that mimics conventional injection pressed CD elements is to provide a support having thereon, in order, a layer of a dye that absorbs recording radiation and generates the needed change in the specular reflectivity and a reflective layer. Exposure of the recording layer through the support by the recording beam heats the recording layer to an extent that it is said that the surface of the heat deformable support just adjacent to the recording layer surface is deformed and the dye or dyes are changed to reduce specular reflectivity. Materials of this type are described in U.S. Pat. No. 4,940,618, European Patent Application 0,353,393 and Canadian Patent Application 2,005,520.

Commercially useful materials of the type described in these references have stringent requirements. One of these requirements is the long term stability of the recorded information on the Photo CD disks. So the materials used for the Photo CD disks must have very good light stability.

SUMMARY OF THE INVENTION

In accordance with the present invention there is provided a dye mixture having:

a) a real index of refraction of at least 1.8 in the 780 to 790 nm region of the spectra;

b) an imaginary index (k) between 0.3 and 0.02 in the 780 to 790 nm region of the spectra;

c) a metallized azo dye comprising an azo group linking a substituted 3-hydroxy-pyridine nucleus to a phenyl nucleus wherein the phenyl nucleus has an alkoxy or thioether substituent at its 2-position; and d) at least a second dye.

The dye(s) d) are one or more dyes selected from the group consisting of cyanines, indoanilines, oxazines, azos, squaryliums, metallized azos, formazans or tetraazacyanines or any other dye or dyes that when mixed with the metallized azo ether dye give the desired indices as calculated with a computer program based on the method of D. A. G. Bruggeman described in Ann. Phys. (Leipzig) 24 (1922), page 636.

The dye mixtures have good indices and excellent light stabilities. The mixtures have excellent recording sensitivities and produce recordings at lower powers than the metallized azo ethers dyes or thioether dyes when used by themselves.

The invention also provides optical recording elements having a transparent substrate bearing a recording layer that, in turn is overcoated with a light reflecting layer, wherein the recording layer comprises a dye mixture of this invention.

This invention also provides a method for recording optical information comprising the steps of:

providing an optical recording element comprising, in the following order, a light transmitting substrate a recording layer containing a dye and a light reflective layer wherein the recording layer contains a dye mixture according to this invention;

focusing an information modulated laser beam on the recording layer thereby forming a pattern of different specular reflectivities in the element.

DETAILED DESCRIPTION OF THE INVENTION

Representative metallized azo dye ethers useful in the invention are included within the general formula (I);

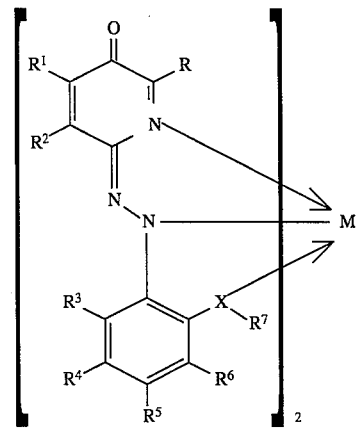

wherein;

R represents alkyl of 1 to 10 carbon atoms, amino, alkylamino, substituted or unsubstituted benzylamino;

$R^1$ represents hydrogen or alkyl of 1 to 6 carbon atoms;

$R^2$ and $R^4$ each independently, represent, hydrogen, alkyl of 1 to 6 carbon atoms, halogen, $SO_2R^8$ or $SO_2NR^9R^{10}$ wherein R8, R9 and R10, each independently, represent alkyl of 1 to 10 carbon atoms, substituted or unsubstituted benzyl, aryl of 6 to 10 carbon atoms or a heteroaryl of 5 to 10 carbon atoms;

$R^1$ and $R^2$ or $R^3$ and $R^4$, taken together with the atoms to which they are attached, may form an aromatic ring;

$R^3$ and $R^6$, each independently, represents hydrogen, alkyl of 1 to 4 carbon atoms or halogen;

$R^5$ is an electron withdrawing group;

$R^7$ represents alkyl of 1 to 6 carbon atoms, alkenyl of 3 to 6 carbon atoms, substituted or unsubstituted benzyl, aryl of 6 to 10 carbon atoms, heteroaryl of 5 to 10 carbon atoms, heteroarylmethyl of 6 to 10 carbon atoms or —$(CH_2)_nY$ wherein n is an integer from 1 to 5 and Y is a cyano or $COOR^8$;

X represents oxygen or sulfur; and

M is a divalent metal ion.

The electron withdrawing groups for $R^5$, are conventional negative Hammett sigma value groups disclosed in Lange's Handbook of Chemistry 14th edition, James A. Dean, McGraw-Hill, Inc., 9.1–9.7 (1992). Preferably, the electron withdrawing groups are nitro, cyano, $SO_2R^8$ or $SO_2NR^9R^{10}$. $R^8$, $R^9$ and $R^{10}$ are defined above.

In the descriptions above, hetero- refers to thienyl and furyl; aromatic ring refers to isoquinoline. Alkyl can be a straight or branched chain group having up to about 10 carbon atoms such as methyl, ethyl or isopropyl. Alkoxy can be, for example, ethoxy or butoxy. Aryl can be, for example, phenyl, aminophenyl or propionylaminophenyl. Heteroaryl can be 2-thienyl. Also various substituents on the these groups are contemplated. For example, alkyl, aryl, heteroaryl, alkenyl group can be substituted with one or more alkoxy, alkoxycarbonyl, aryloxy, aryloxycarbonyl, carbamoyl, sulfamoyl, acylamino, sulfonylamino, halogen, ureido, hydroxy, carbamoyloxy, alkoxycarbonylamino, cyano, thiocyano or carboxy groups.

Various divalent metals are contemplated for M, illustrated above. Such divalent metals are copper, zinc, or nickel and others that are known to promote writability and a sufficient index of refraction.

Representative compounds within structure I are presented in Table I. In this table M represents nickel.

TABLE I

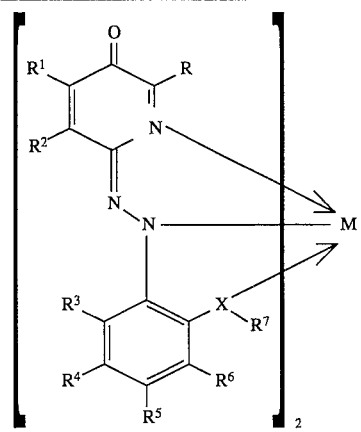

| Dye No. | R | $R^1$ | $R^2$ | $R^3$ | $R^4$ | $R^5$ | $R^6$ | X | $R^7$ |
|---|---|---|---|---|---|---|---|---|---|
| 1 | $NH_2$ | $CH_3$ | $CH_3SO_2$ | H | H | $NO_2$ | H | O | $CH_3$ |
| 2 | $NH_2$ | $CH_3$ | $CH_3SO_2$ | H | H | $NO_2$ | H | O | $CH_2CH=CH_2$ |
| 3 | $NHCH_2Ph$ | $CH_3$ | $CH_3SO_2$ | H | H | $NO_2$ | H | O | $CH_3$ |
| 4 | $NH_2$ | $CH_3$ | $CH_3SO_2$ | H | H | $NO_2$ | H | O | $CH_2\overset{\underset{\|}{O}}{C}OCH_2CH_3$ |
| 5 | $NH_2$ | H | $SO_2NHCH(CH_3)_2$ | H | H | $NO_2$ | H | O | $CH_3$ |
| 6 | $NH_2$ | $CH_3$ | $CH_3SO_2$ | H | F | $NO_2$ | H | O | $CH_3$ |
| 7 | $NH_2$ | $CH_3$ | $CH_3SO_2$ | H | H | $NO_2$ | H | O | 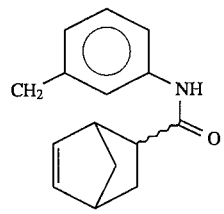 |
| 8 | $NH_2$ | $CH_3$ | $CH_3SO_2$ | H | H | $NO_2$ | H | O | $CH_2CH_2COOCH_2CH_3$ |

TABLE I-continued

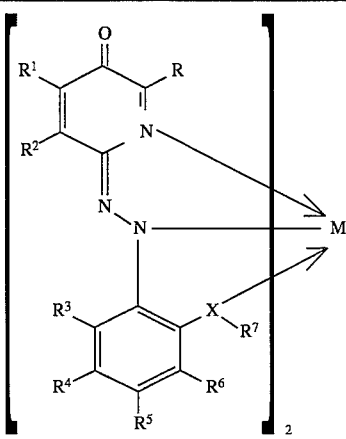

| Dye No. | R | R¹ | R² | R³ | R⁴ | R⁵ | R⁶ | X | R⁷ |
|---|---|---|---|---|---|---|---|---|---|
| 9 | $NH_2$ | H | $CH_3SO_2$ | H | H | $NO_2$ | H | O | $CH_2$-(2,4-dimethylphenyl) |
| 10 | $NH_2$ | $CH_3$ | $CH_3SO_2$ | H | H | $NO_2$ | H | S | $CH_2CH_2COOCH_2CH_3$ |
| 11 | $NH_2$ | $CH_3$ | $CH_3SO_2$ | H | H | $NO_2$ | H | O | $CH_2$-phenyl |
| 12 | $NH_2$ | H | $CH_3SO_2$ | H | H | $NO_2$ | H | O | $CH_2$-(4-$C(CH_3)_3$-phenyl) |
| 13 | $NH_2$ | H | $CH_3CH_2SO_2$ | H | H | $NO_2$ | H | O | $CH_2$-(4-$NO_2$-phenyl) |
| 14 | $NH_2$ | $CH_3$ | $CH_3SO_2$ | H | H | $NO_2$ | H | O | $CH_2$-(4-$C(CH_3)_3$-phenyl) |
| 15 | $CH_3$ | \\ // | | H | H | $NO_2$ | H | S | $CH_2CH_2COOCH_2CH_3$ |
| 16 | $CH_3$ | \\ // | | H | H | $SO_2CH_3$ | H | S | $CH_2CH_2CN$ |
| 17 | $NH_2$ | H | $CH_3CH_2SO_2$ | H | H | $NO_2$ | H | O | $CH_3$ |
| 18 | $NH_2$ | $CH_3$ | $CH_3CH_2SO_2$ | H | H | $NO_2$ | H | O | $CH_2$-(furan-2-yl-5-$COOCH_3$) |
| 19 | $NH_2$ | H | $CH_3SO_2$ | H | H | $NO_2$ | H | O | $CH_3$ |
| 20 | $NH_2$ | $CH_3$ | $CH_3SO_2$ | H | H | $NO_2$ | H | O | $CH_2CH=CH_2$ |
| 21 | $NH_2$ | $CH_3$ | $(CH_3CH_2)(CH_3)CHSO_2$ | H | H | $NO_2$ | H | O | $CH_2$-(4-$NO_2$-phenyl) |

TABLE I-continued

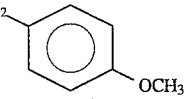

| Dye No. | R | R¹ | R² | R³ | R⁴ | R⁵ | R⁶ | X | R⁷ |
|---|---|---|---|---|---|---|---|---|---|
| 22 | $NH_2$ | $CH_3$ | $CH_3CH_2SO_2$ | H | H | $NO_2$ | H | O | $CH_2$-C₆H₄-$OCH_3$ |
| 23 | $NH_2$ | $CH_3$ | $CH_3CH_2SO_2$ | H | H | $NO_2$ | H | O | $CH_2$-(2-thienyl) |
| 24 | $NH_2$ | $CH_3$ | $CH_3CH_2SO_2$ | H | H | $NO_2$ | H | S | $CH_2$-C₆H₅ |
| 25 | $NH_2$ | $CH_3$ | $CH_3CH_2SO_2$ | H | H | $NO_2$ | H | O | $CH_2$-C₆H₄-$NO_2$ |
| 26 | $NH_2$ | $CH_3$ | $CH_3SO_2$ | H | H | $NO_2$ | H | O | $CH_2CH{=}CHCH_3$ |
| 27 | $NH_2$ | $CH_3$ | $CH_3SO_2$ | H | H | $NO_2$ | H | O | $CH_2C({CH_3}){=}CH_2$ |
| 28 | $NH_2$ | H | $CH_3SO_2$ | H | H | $NO_2$ | H | O | $CH_3$ |
| 29 | $NH_2$ | $CH_3$ | $CH_3CH_2SO_2$ | H | H | $NO_2$ | H | O | $CH_2CH{=}CH_2$ |
| 30 | $NH_2$ | $CH_3$ | $CH_3CH_2SO_2$ | H | H | $NO_2$ | H | O | C₆H₅ |
| 31 | $NH_2$ | $CH_3$ | $CH_3CH_2SO_2$ | H | H | $NO_2$ | H | O | $CH_2CH{=}CHCO_2CH_3$ |
| 32 | $NH_2$ | H | $CH_3CH_2SO_2$ | H | H | $NO_2$ | H | O | $CH_2$-C₆H₅ |
| 33 | $NH_2$ | $CH_3$ | $CH_3SO_2$ | H | F | $NO_2$ | H | O | $CH_2$-C₆H₄-$C(CH_3)_3$ |
| 34 | $NH_2$ | $CH_3$ | $CH_3CH(CH_3)SO_2$ | H | H | $NO_2$ | H | O | $CH_2$-C₆H₄-$CH_3$ |

The dyes of Structure I, including those of Table 1, are prepared by first alkylating a 2-hydroxy- 4-nitroaniline with the an organic halide having the $R^7$ substituents defined above was carried out either in DMF or acetone using potassium carbonate as a base to form an ether alkoxy derivative. The latter derivative is diazotized and coupled with a substituted 5-bromo-3-pyridinol. Bromine is displaced with sulfinate to form a 5-alkyl sulfonyl-6-(2-alkoxyphenylazo)-3-pyridinol. The latter is metallized with a divalent metal salt complex. The following preparatory example is presented to illustrate the general method in more detail.

PREPARATORY, EXAMPLE OF COMPOUND 11, TABLE 1

First 2-hydroxy-4-nitroaniline (8 g) was placed in a round bottom flask together with DMF (80 ml), potassium carbonate (8.7 g) and potassium iodide (0.1 g) and the mixture heated at 80° with stirring. Benzyl chloride (3.5 g) was added dropwise and heating continued for 4 hours. At the end of this time the mixture was added to ice and stirred vigorously. After the product solidified it was filtered off and washed with dilute sodium hydroxide solution followed by water. The nmr spectrum of the dried material was in accord with 2-benzyloxy-4-nitroaniline.

Next, the 2-benzyloxy-4-nitroaniline was diazotized with nitrosylsulfuric acid in a mixture of acetic and propionic acids. After 2 hours any excess nitrous acid was destroyed by the addition of urea and the diazo solution was added to a solution of 2-amino- 5-bromo-3-hydroxy-4-methylpyridine (6 g) in methanol (300 ml.) containing sodium acetate (30 g) below 5°. [a.k.a. coupling process] When dye formation was complete the solution was diluted with water and the product, 2-amino-6-(2-benzyloxy-4-nitrophenylazo)-5-bromo- 3-hydroxy-4-methylpyridine filtered off.

The above bromo compound was dissolved in DMF (100 mL) and treated with sodium methanesulfinate (2 g) and the mixture stirred for five hours. The product was isolated by pouring the mixture into water containing sodium nitrate (20 g) and filtering off the precipitated material. The dried dye material had an nmr spectrum in accord with the proposed structure.

The dye (was added to methanol (60 mL) and nickel acetate (0.63 g) added in portions with stirring while heating the solution at gentle reflux for 30 minutes. The solution was allowed to cool and the product filtered off. The absorption max in acetone was 613 nm and the extinction coefficient was $9.23 \times 10^4$.

Other dyes of table 1 were prepared using similar procedures except for except for compounds 8, 10, 15, 16 and 24. For these five compounds the first step of the above described general procedure was altered. Instead thioether and ether substituted amine compounds were prepared by procedures known to those skilled in the art and then subjected to the remaining steps of the general process.

Representative dyes of Table 1 were mixed with at least a second dye, selected from those classes of dyes referred to hereinbefore, to produce the inventive mixtures of Table 2. The invention contemplates mixtures comprising one or more dyes selected from such classes.

TABLE 2

Dye Mixtures

| Mixture No. | Table 1 Dye No. | Added Dye No. | Structure of Added Dye(s) | Ratio Dyes | Refractive Index at 788 nm |
|---|---|---|---|---|---|
| 1 | 14 | B-1 | 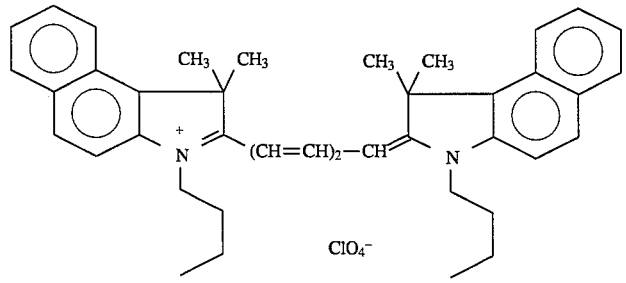 | 4/1 | calc. 2.33–0.049i found 2.28–0.042i |
| 2 | 14 | B-2 | 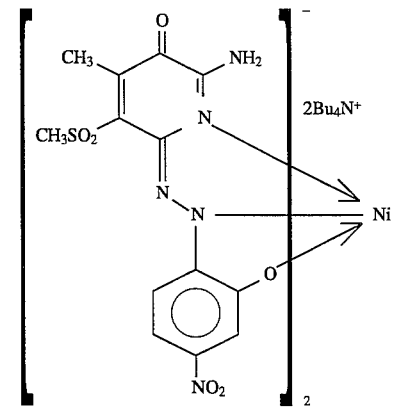 | 4/1 | calc. 2.19–0.077i |

TABLE 2-continued
Dye Mixtures
| Mixture No. | Table 1 Dye No. | Added Dye No. | Structure of Added Dye(s) | Ratio Dyes | Refractive Index at 788 nm |
|---|---|---|---|---|---|
| 3 | 14 | B-3 | 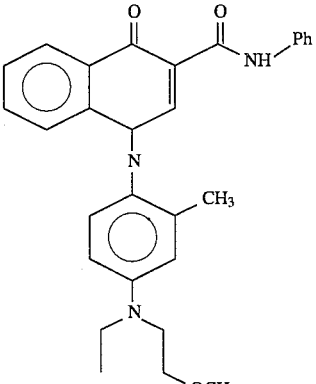 | 9/1 | calc. 2.18–0.051i |
| 4 | 14 | B-4 | 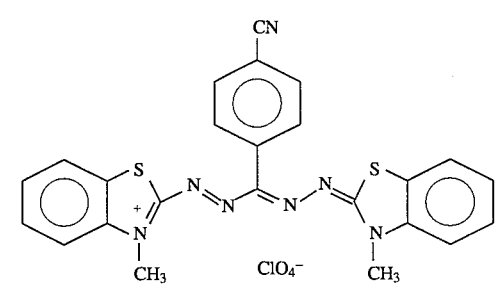 | 4/1 | calc. 2.16–0.054i |
| 5 | 14 | B-5 | 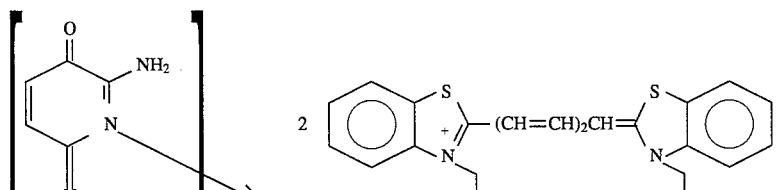 | 4/1 | calc. 2.29–0.05i |
| 6 | 14 | B-6 | 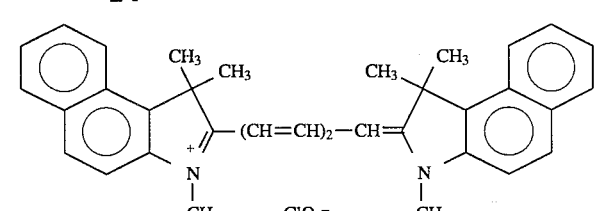 | 1/1 | calc. 2.48–0.04i found 2.46–0.05i |
| 7 | 14 | B-6 | As above | 1/2 | calc. 2.57–0.04i |

TABLE 2-continued

Dye Mixtures

| Mixture No. | Table 1 Dye No. | Added Dye No. | Structure of Added Dye(s) | Ratio Dyes | Refractive Index at 788 nm |
|---|---|---|---|---|---|
| 8 | 5 | B-1 | (structure shown: bis-benzoindolenine pentamethine cyanine with N-butyl groups, gem-dimethyl, ClO₄⁻ counterion) | 4/1 | calc. 2.23–0.049i |
| 9 | 23 | B-1 | As above | 4/1 | calc. 2.23–0.06i |
| 10 | 12 | B-1 | As above | 4/1 | calc. 2.13–0.05i |
| 11 | 26 | B-1 | As above | 4/1 | calc. 2.45–0.08i |
| 12 | 27 | B-1 | As above | 4/1 | calc. 2.31–0.06i |
| 13 | 28 | B-1 | As above | 4/1 | calc. 2.5–0.06i found 2.387–0.10i |
| 14 | 29 | B-1 | As above | 4/1 | calc. 2.41–0.06i |
| 15 | 18 | B-1 | As above | 4/1 | calc. 2.3–0.05i found 2.26–0.03i |
| 16 | 34 | B-1 | As above | 4/1 | calc. 2.34–0.05i |
| 17 | 11 | B-1 | As above | 1/2 | calc. 2.7–0.14i found 2.60–0.05i |

The optical recording elements of the invention comprises a light transmitting, typically pregrooved substrate, with the metallized azo dye recording layer overlaying the substrate and a light reflective layer overlaying the light absorptive layer. A protective layer overlays the light reflective layer. The preferred embodiment is that of a writable compact disc (CD). The write and read lasers are of the laser diode type and operate in the infrared region between 775 and 800 nm.

Recording is accomplished by focusing an information (alphanumeric or image) modified laser beam on the azo dye recording layer. The result causes a pattern of change in the specular reflectivity of the element. This pattern constitutes the recorded information. This pattern, when scanned by the read laser, is seen as a pattern of reflectivity modulation that is converted back into the recorded information by playback electronics. For the preferred CD format, the element is written with a diode laser emitting between 775 and 800 nm and read with a diode laser emitting between 775 and 800 nm. With the CD format it is preferred that the metallized azo dye be selected so that the real part of the complex refractive index (N) of the unwritten light absorptive layer measured with 788 nm light source is not less than 1.8 and the imaginary part (k) is not greater than 0.15.

The substrate may be any transparent material that satisfies the mechanical and optical requirements. Generally the substrate is pregrooved with groove depths from 20 nm to 250 nm, groove widths 0.2 to 1 µm and a pitch of 1 to 2 µm.

The preferred material is polycarbonate. Other useful materials include glass, polymethylmethacrylate and other suitable polymeric materials.

The preparation of the optical recording element of the invention is achieved by spin coating of the dye mixture by itself, or with other addenda from a suitable solvent onto a transparent substrate. For coating, the dye mixture with or without addenda is dissolved in a suitable solvent so that the dye is 20 or less parts by weight to 100 parts of solvent by volume. The dye recording layer of the element is then overcoated with a metal reflective layer under reduced pressure by resistive heating or a sputter method and finally overcoated with a protective resin.

Coating solvents for the dye recording layer are selected to minimize their effect on the substrate. Useful solvents include as alcohols, ethers, hydrocarbons, hydrocarbon halides, cellosolves, ketones. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellosolve, ethyl cellosolve, 1-methyl-2-propanol, methy ethyl ketone, 4-hydroxy-4-methyl-2-pentanone, hexane, cyclohexane, ethylcyclohexane, octane, benzene, toluene, and xylene. Other less desirable solvents include water and dimethylsulfoxide. Preferred solvents are hydrocarbon solvents and alcohol solvents since they have the least effect on the preferred polycarbonate substrates. Mixtures of solvents can also be used.

The reflective layer can be any of the metals conventionally used for reflective layer in optical recording layers. Useful metals can be vacuum evaporated or sputtered and include gold, silver, aluminum, copper and alloys of such metals thereof.

The protective layer over the reflective layer is similarly conventional for this art. Useful materials include UV curable acrylates. For more information on protective layers see James C. Fleming's *Optical Recording in Organic Media: Thickness Effects*, Journal of Imaging Science, Vol. 33, No. 3, May/June 1989, pages 65–68.

Kz filter, forming marks of lower reflectivity than the unmarked area when examined with a light source emitting at 788 nm light. When the marks were read with the read laser, for these dye mixtures CNRs (carrier to noise ratio) as shown in Table 3 were obtained.

The improved performance with the mixtures of table 2 is shown in Table 3 by comparing the CNR-s (Carrier to Noise Ratios) produced on recording at 14 mW write power with Table 1 dyes by themselves and with the mixtures of Table 2. The CNR-s for each of the Table 2 mixtures recording layers was higher than the recording layers prepared with a Table 1 dye alone.

TABLE 3

| Ex. No. | Table 2 Mixture No. | Table 1 Dye No. | Added Dye No. | Optical Density | Index | % Groove Reflectance 788 nm | CNR (dB) 14 MW 5.6 m/s 788 nm |
| --- | --- | --- | --- | --- | --- | --- | --- |
| 1 | 0 | 14 | None | 1.35 | 2.2–0.02i | 69 | 27 |
| 2 | 1 | 14 | B-1 | 0.88 | 2.3–0.05i | 67 | 59 |
| 3 | 4 | 14 | B-4 | 1.03 | 2.2–0.05i | 68 | 61 |
| 4 | 5 | 14 | B-5 | 1.42 | 2.3–0.05i | 75 | 60 |
| 5 | 0 | 5 | None | 1.67 | 2.1–0.02i | 71 | 15 |
| 6 | 8 | 5 | B-1 | 0.91 | 2.3–0.05i | 72 | 55 |

The element of the invention can have prerecorded ROM areas as described in U.S. Pat. No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

The following examples demonstrate the utility of the dyes of the invention in optical recording elements.

EXAMPLES 1–6

A polycarbonate disc substrate having a thickness of 1.2 mm, an outer diameter of 120 mm and an inner diameter of 15 mm with a spiral groove on its surface with a width of 0.4 um, and a depth of 0.08 um and a pitch of 1.6 um, was made by injection molding.

To form the light absorptive layer 1.0 part by weight of a Table 2 dye mixture (2, 3, 4 and 6) or a Table 1 dye alone (1 and 5) was dissolved with stirring at room temperature in 1 hour with 40 parts of 2,2,3,3-tetrafluoropropanol by volume. Then the solution was filtered through a 0.2 u filter. The solution was coated on the surface of the substrate by spin coating to an overall optical density as shown in Table 3 at 671 nm. It was dried at 80° C. for 15 minutes.

Then a gold reflective layer was deposited by resistive heating on the entire surface of the disc to about 1200 A thickness. A lacquer (DAICURE FD-17™ from Dainippon Inc. Chemical) was applied by spin coating onto the gold layer to a thickness of 7 to 11 um. It was UV cured with an 'H' bulb using a fusion system cure at 3000 W/2.5 cm power for 15 seconds.

To test the optical disc thus obtained a test system consisting of an optical head with a 788 nm laser, a 0.5 NA lens, phase tracking, and ½ aperture focusing was used. The optics used circularly polarized light to reduce laser feedback effects. Recording and play back were carried out with the same laser at 5.6 m/s rotational speed. The read power was kept at 0.6 mW. Single frequency was recorded with a 3.5 micron mark length at 14 mW write power, through 30

In the following examples 7–20 the same disk substrate solvent, solution concentration, filter, spin coater, drying conditions, gold deposition process, lacquer layer application and testing procedure was used as in examples 1–6.

EXAMPLE 7

The dye mixture consisted of 0.9 part of dye 14 and 0.1 part of dye B-3. The dye was coated on the grooved surface of the substrate to an overall optical density of 1.37 at 671 nm. When writing with 14 mW write power a 42 dB CNR was obtained on reading.

EXAMPLE 8

The dye mixture consisted of 0.8 part of dye 8 and 0.2 part of dye B-1. The dye was coated on the grooved surface of the substrate to an overall optical density of 0.97 at 671 nm. When writing with 14 mW write power a 55 dB CNR was obtained on reading.

EXAMPLE 9

The dye mixture consisted of 0.8 part of dye 23 and 0.2 part of dye B-1. The dye was coated on the grooved surface of the substrate to an overall optical density of 1.4 at 671 nm. When writing with 14 mW write power a 66 dB CNR was obtained on reading.

EXAMPLE 10

The dye mixture consisted of 0.8 part of dye 12 and 0.2 part of dye B-1. The dye was coated on the grooved surface of the substrate to an overall optical density of 1.1 at 671 nm. When writing with 14 mW write power a 55 dB CNR was obtained on reading.

EXAMPLE 11

The dye mixture consisted of 0.8 part of dye 26 and 0.2 part of dye B-1. The dye was coated on the grooved surface of the substrate to an overall optical density of 1.37 at 671 nm. When writing with 14 mW write power a 65 dB CNR was obtained on reading.

EXAMPLE 12

The dye mixture consisted of 0.8 part of dye 27 and 0.2 part of dye B-1. The dye was coated on the grooved surface of the substrate to an overall optical density of 1.47 at 671 nm. When writing with 14 mW write power a 62 dB CNR was obtained on reading.

EXAMPLE 13

The dye mixture consisted of 0.8 part of dye 28 and 0.2 part of dye B-1. The dye was coated on the grooved surface of the substrate to an overall optical density of 1.34 at 671 nm. When writing with 14 mW write power a 57 dB CNR was obtained on reading.

EXAMPLE 14

The dye mixture consisted of 0.8 part of dye 29 and 0.2 part of dye B-1. The dye was coated on the grooved surface of the substrate to an overall optical density of 1.27 at 671 nm. When writing with 14 mW write power a 52 dB CNR was obtained on reading.

EXAMPLE 15

The dye mixture consisted of 0.8 part of dye 28 and 0.2 part of dye B-1. The dye was coated on the grooved surface of the substrate to an overall optical density of 1.42 at 671 nm. When writing with 14 mW write power a 56 dB CNR was obtained on reading.

EXAMPLE 16

The dye mixture consisted of 0.8 part of dye 34 and 0.2 part of dye B-1. The dye was coated on the grooved surface of the substrate to an overall optical density of 1.37 at 671 nm. When writing with 14 mW write power a 65 dB CNR was obtained on reading.

EXAMPLE 17

The dye mixture consisted of 0.5 part of dye 14 and 0.5 part of dye B-6. The dye was coated on the grooved surface of the substrate to an overall optical density of 1.34 at 671 nm. When writing with 14 mW write power a 61 dB CNR was obtained on reading.

EXAMPLE 18

The dye mixture consisted of 0.8 part of dye 14 and 0.2 part of dye B-6. The dye was coated on the grooved surface of the substrate to an overall optical density of 1.47 at 671 nm. When writing with 14 mW write power a 60 dB CNR was obtained on reading.

The invention has been described in detail with particular reference to preferred embodiments thereof, but it will be understood that variations and modifications can be effected within the spirit and scope of the invention.

What is claimed is:

1. An optical recording element having a transparent substrate bearing a recording layer that is overcoated with a light reflective layer wherein said recording layer comprises a dye mixture having:
   a) a real index of refraction of at least 1.8 in the 780 to 790 nm region of the spectra;
   b) an imaginary index (k) between 0.3 and 0.02 in the 780 to 790 nm region of the spectra;
   c) a metallized azo dye comprising an azo group linking a substituted 3-hydroxy-pyridine nucleus to a phenyl nucleus wherein the phenyl nucleus has an alkoxy or thioether substituent at its 2-position; and
   d) at least a second dye.

2. The element of claim 1 wherein the metallized azo dye has a formula:

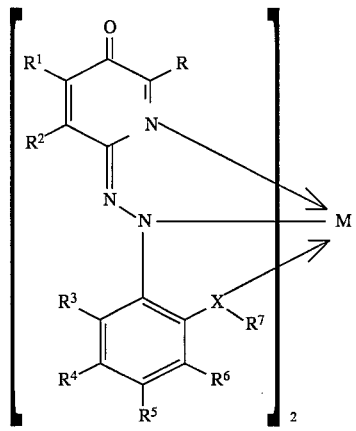

wherein;

$R$ represents alkyl of 1 to 4 carbon atoms, amino, alkylamino or benzylamino;

$R^1$ represents hydrogen or alkyl of 1 to 6 carbon atoms;

$R^2$ and $R^4$, each independently, represent, hydrogen, alkyl of 1 to 6 carbon atoms, halogen, $SO_2R^8$ or $SO_2NR^9R^{10}$ wherein $R^8$, $R^9$ and $R^{10}$, each independently, represent alkyl of 1 to 10 carbon atoms, benzyl, aryl of 6 to 10 carbon atoms or a heteroaryl of 5 to 10 carbon atoms;

$R^1$ and $R^2$ or $R^3$ and $R^4$, taken together with the atoms to which they are attached, may form an aromatic ring;

$R^3$ and $R^6$, each independently, represents hydrogen, alkyl of 1 to 4 carbon atoms or halogen;

$R^5$ is an electron withdrawing group;

$R^7$ represents alkyl of 1 to 6 carbon atoms, alkenyl of 3 to 6 carbon atoms, benzyl, aryl of 6 to 10 carbon atoms, heteroaryl of 5 to 10 carbon atoms, heteroarylmethyl of 6 to 10 carbon atoms or $-(CH_2)_nY$ wherein n is an integer from 1 to 5 and Y is a cyano or $COOR^8$;

X represents oxygen or sulfur; and

M is a divalent metal ion.

3. The element of claim 2 wherein R represents amino, methyl or aminomethylphenyl;

$R^1$ represents hydrogen or methyl;

$R^2$ represents methylsulfonyl, isopropylsulfamoyl or isopropylsulfonyl; or $R^1$ and $R^2$ taken together with the atoms to which they are attached form a benzene ring;

$R^3$ represent hydrogen;

$R^4$ represent hydrogen, chlorine or fluorine;

$R^5$ represents dicyanoethylidene, nitro or methylsulfonyl;

$R^6$ represents hydrogen;

$R^7$ represents alkyl of 1 to 6 carbon atoms, alkenyl of 3 to 6 carbon atoms, benzyl, aryl of 6 to 10 carbon atoms, heteroaryl of 5 to 10 carbon atoms, heteroarylmethyl of 6 to 10 carbon atoms or $-(CH_2)_nY$ wherein n is an integer from 1 to 5 and Y is a cyano or $COOR^8$;

X represents —O— or —S— and

M represents nickel.

4. The element of claim 3 comprising a metallized azo ether dye selected from the dyes of Table I as follows:

TABLE I

[Structure: pyridone-azo-phenyl metal complex with substituents R, R¹, R² on pyridone ring; R³, R⁴, R⁵, R⁶ on phenyl; X-R⁷ ortho substituent; M = metal; shown as bis-complex]

| Dye No. | R | R¹ | R² | R³ | R⁴ | R⁵ | R⁶ | X | R⁷ |
|---|---|---|---|---|---|---|---|---|---|
| 1 | $NH_2$ | $CH_3$ | $CH_3SO_2$ | H | H | $NO_2$ | H | O | $CH_3$ |
| 2 | $NH_2$ | $CH_3$ | $CH_3SO_2$ | H | H | $NO_2$ | H | O | $CH_2CH=CH_2$ |
| 3 | $NHCH_2Ph$ | $CH_3$ | $CH_3SO_2$ | H | H | $NO_2$ | H | O | $CH_3$ |
| 4 | $NH_2$ | $CH_3$ | $CH_3SO_2$ | H | H | $NO_2$ | H | O | $CH_2COCH_2CH_3$ |
| 5 | $NH_2$ | H | $SO_2NHCH(CH_3)_2$ | H | H | $NO_2$ | H | O | $CH_3$ |
| 6 | $NH_2$ | $CH_3$ | $CH_3SO_2$ | H | F | $NO_2$ | H | O | $CH_3$ |
| 7 | $NH_2$ | $CH_3$ | $CH_3SO_2$ | H | H | $NO_2$ | H | O | $CH_2$-(3-methylphenyl)-NH-C(O)-norbornenyl |
| 8 | $NH_2$ | $CH_3$ | $CH_3SO_2$ | H | H | $NO_2$ | H | O | $CH_2CH_2COOCH_2CH_3$ |
| 9 | $NH_2$ | H | $CH_3SO_2$ | H | H | $NO_2$ | H | O | $CH_2$-(3,4-dimethylphenyl) |
| 10 | $NH_2$ | $CH_3$ | $CH_3SO_2$ | H | H | $NO_2$ | H | S | $CH_2CH_2COOCH_2CH_3$ |
| 11 | $NH_2$ | $CH_3$ | $CH_3SO_2$ | H | H | $NO_2$ | H | O | $CH_2$-phenyl |
| 12 | $NH_2$ | H | $CH_3SO_2$ | H | H | $NO_2$ | H | O | $CH_2$-(4-$C(CH_3)_3$-phenyl) |
| 13 | $NH_2$ | H | $CH_3CH_2SO_2$ | H | H | $NO_2$ | H | O | $CH_2$-(4-$NO_2$-phenyl) |
| 14 | $NH_2$ | $CH_3$ | $CH_3SO_2$ | H | H | $NO_2$ | H | O | $CH_2$-(4-$C(CH_3)_3$-phenyl) |

TABLE I-continued

[Structure: a complex metal-complex azo dye structure with R, R¹, R², R³, R⁴, R⁵, R⁶, X, R⁷ substituents, with M metal center, subscript 2]

| Dye No. | R | R¹ | R² | R³ | R⁴ | R⁵ | R⁶ | X | R⁷ |
|---|---|---|---|---|---|---|---|---|---|
| 15 | $CH_3$ | \\_// | | H | H | $NO_2$ | H | S | $CH_2CH_2COOCH_2CH_3$ |
| 16 | $CH_3$ | \\_// | | H | H | $SO_2CH_3$ | H | S | $CH_2CH_2CN$ |
| 17 | $NH_2$ | H | $CH_3CH_2SO_2$ | H | H | $NO_2$ | H | O | $CH_3$ |
| 18 | $NH_2$ | $CH_3$ | $CH_3CH_2SO_2$ | H | H | $NO_2$ | H | O | $CH_2$-(furan)-$COOCH_3$ |
| 19 | $NH_2$ | H | $CH_3SO_2$ | H | H | $NO_2$ | H | O | $CH_3$ |
| 20 | $NH_2$ | $CH_3$ | $CH_3SO_2$ | H | H | $NO_2$ | H | O | $CH_2CH=CH_2$ |
| 21 | $NH_2$ | $CH_3$ | $(CH_3CH_2)(CH_3)CHSO_2$ | H | H | $NO_2$ | H | O | $CH_2$-(C$_6$H$_4$)-$NO_2$ |
| 22 | $NH_2$ | $CH_3$ | $CH_3CH_2SO_2$ | H | H | $NO_2$ | H | O | $CH_2$-(C$_6$H$_4$)-$OCH_3$ |
| 23 | $NH_2$ | $CH_3$ | $CH_3CH_2SO_2$ | H | H | $NO_2$ | H | O | $CH_2$-(thiophene) |
| 24 | $NH_2$ | $CH_3$ | $CH_3CH_2SO_2$ | H | H | $NO_2$ | H | S | $CH_2$-(phenyl) |
| 25 | $NH_2$ | $CH_3$ | $CH_3CH_2SO_2$ | H | H | $NO_2$ | H | O | $CH_2$-(C$_6$H$_4$)-$NO_2$ |
| 26 | $NH_2$ | $CH_3$ | $CH_3SO_2$ | H | H | $NO_2$ | H | O | $CH_2CH=CHCH_3$ |
| 27 | $NH_2$ | $CH_3$ | $CH_3SO_2$ | H | H | $NO_2$ | H | O | $CH_2C(CH_3)=CH_2$ |
| 28 | $NH_2$ | H | $CH_3SO_2$ | H | H | $NO_2$ | H | O | $CH_3$ |
| 29 | $NH_2$ | $CH_3$ | $CH_3CH_2SO_2$ | H | H | $NO_2$ | H | O | $CH_2CH=CH_2$ |
| 30 | $NH_2$ | $CH_3$ | $CH_3CH_2SO_2$ | H | H | $NO_2$ | H | O | (phenyl) |

TABLE I-continued
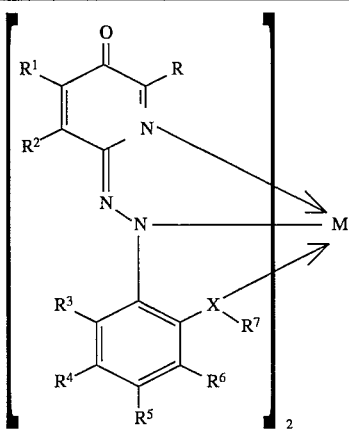
| Dye No. | R | R¹ | R² | R³ | R⁴ | R⁵ | R⁶ | X | R⁷ |
|---|---|---|---|---|---|---|---|---|---|
| 31 | $NH_2$ | $CH_3$ | $CH_3CH_2SO_2$ | H | H | $NO_2$ | H | O | $CH_2CH{=}CHCO_2CH_3$ |
| 32 | $NH_2$ | H | $CH_3CH_2SO_2$ | H | H | $NO_2$ | H | O | $CH_2$–phenyl |
| 33 | $NH_2$ | $CH_3$ | $CH_3SO_2$ | H | F | $NO_2$ | H | O | $CH_2$–C₆H₄–$C(CH_3)_3$ |
| 34 | $NH_2$ | $CH_3$ | $CH_3CH(CH_3)SO_2$ | H | H | $NO_2$ | H | O | $CH_2$–C₆H₄–$CH_3$ |
5. The element of claim 4 comprising one or more dyes selected from the group consisting of dye numbers B-1, B-2, B-3, B-4, B-5 and B-6 below:
| Dye No. | Structure |
|---|---|
| B-1 |  |

-continued
| Dye No. | Structure |
|---|---|
| B-2 | 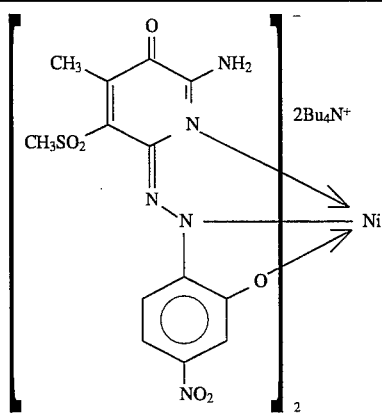 |
| B-3 | 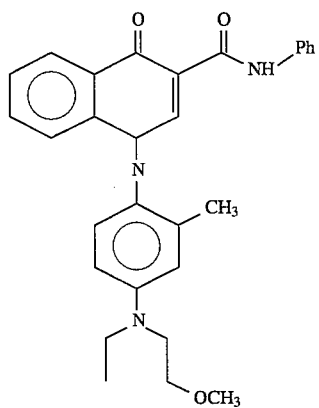 |
| B-4 | 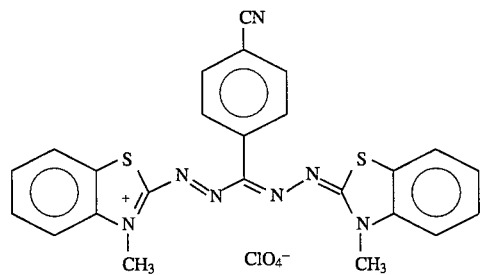 |
| B-5 | 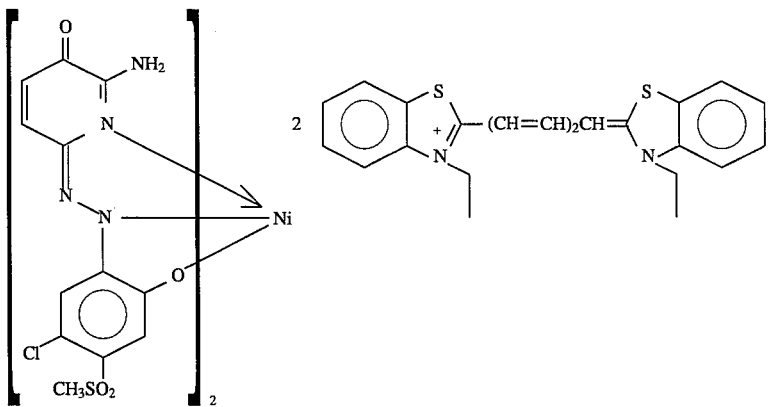 |

| Dye No. | Structure |
|---|---|
| B-6 | 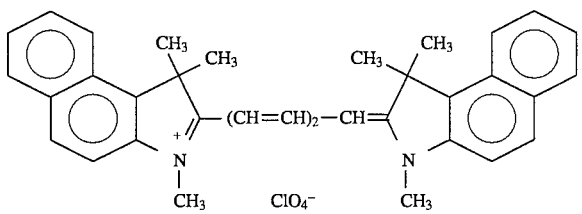 |

6. The element of claim 5 wherein the concentration of a metal azo dye ether to the second dye is in the range of 5% to 95%.

7. The element of claim 1 comprising at least a second dye selected from the group consisting of cyanine, indoaniline, oxazine, azo, squarilium, metallized azo, formazan and tetraazacyanine dyes.

8. The element of claim 1 with a recording layer having dye mixture comprising the dye:

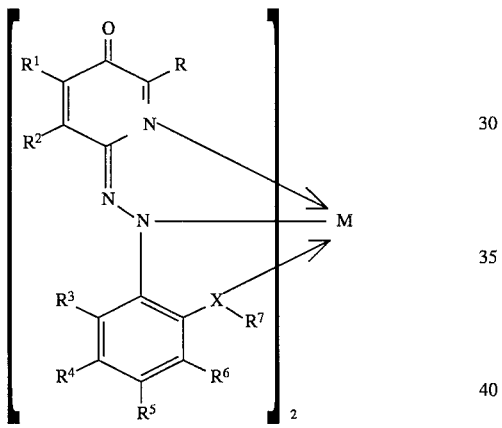

wherein R is $NH_2$; $R^1$ is $CH_3$; $R^2$ is $CH_3SO_2$; $R^3$, $R^4$ and $R^6$ is hydrogen, $R^5$ is $NO_2$; X is O and $R^7$ is

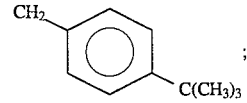

and one or more dyes are selected from the group consisting of dyes B-1, B-2, B-3, B-4, B-5 and B-6 as follows:

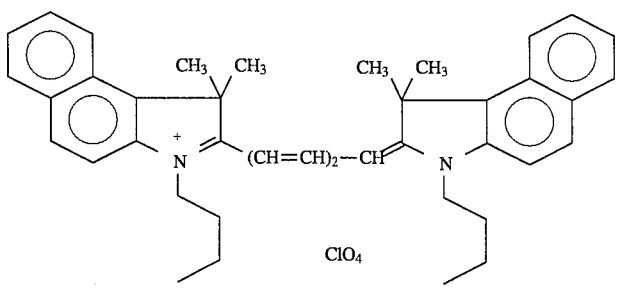

-continued
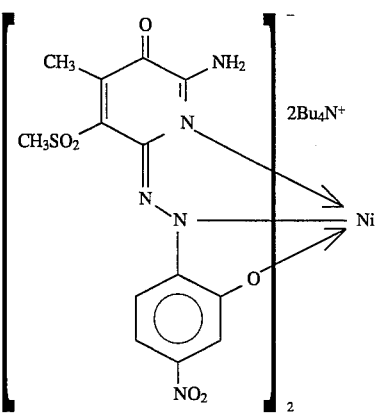
B-2
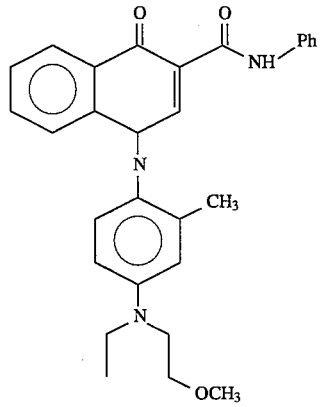
B-3
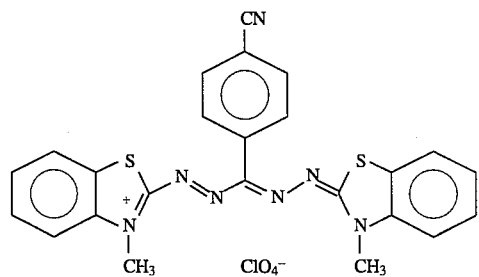
B-4
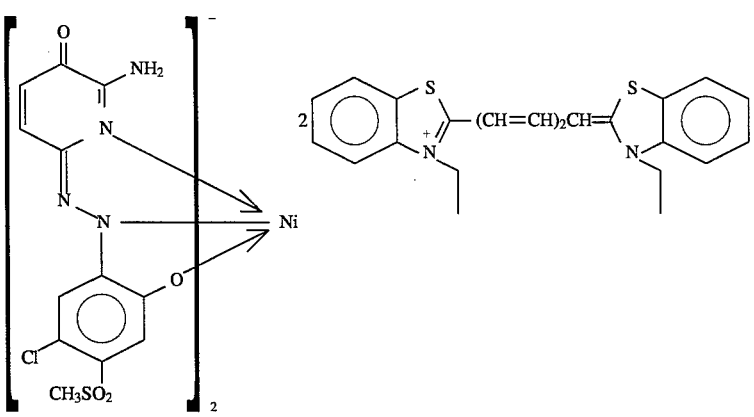
B-5
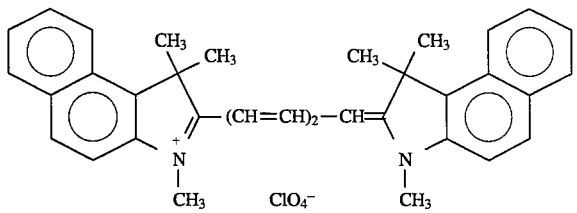
B-6

9. A method for recording optical information comprising the steps of:

provide an optical recording element comprising, in the following order, a light transmitting substrate a recording layer containing a dye and a light reflective layer wherein the recording layer has:
- a) a real index of refraction of at least 1.8 in the 780 to 790 nm region of the spectra;
- b) an imaginary index (k) between 0.3 and 0.02 in the 780 to 790 nm region of the spectra; and
- c) a metallized azo dye comprising an azo group linking a substituted 3-hydroxy-pyridine nucleus to a phenyl nucleus wherein the phenyl nucleus has an alkoxy or thioether substituent at its 2-position;
- d) at least a second dye; and focusing an information modulated laser beam on the recording layer thereby forming a pattern of different specular reflectivity in the element.

* * * * *